US005726808A

United States Patent [19]
Suzuki

[11] Patent Number: 5,726,808
[45] Date of Patent: Mar. 10, 1998

[54] EYEPIECE LENS WITH WIDE APPARENT FIELD OF VIEW

[75] Inventor: Masami Suzuki, Yokohama, Japan

[73] Assignee: Nikon Corporation, Tokyo, Japan

[21] Appl. No.: 707,335

[22] Filed: Sep. 3, 1996

[30] Foreign Application Priority Data

Sep. 4, 1995 [JP] Japan ................... 7-251946

[51] Int. Cl.$^6$ .................. G02B 25/00; G02B 3/02
[52] U.S. Cl. .................. 359/645; 359/643; 359/716
[58] Field of Search .................. 359/643, 644, 359/645, 716, 784, 787, 788, 789, 791, 792

[56] References Cited

U.S. PATENT DOCUMENTS

| | | | |
|---|---|---|---|
| 2,186,622 | 1/1940 | Bertele | 359/787 |
| 2,995,980 | 8/1961 | Zimmermann et al. | 359/787 |
| 3,384,434 | 5/1968 | Scidmore et al. | 359/644 |
| 3,623,791 | 11/1971 | Uetake | 359/644 |
| 4,099,842 | 7/1978 | Kaneko | 359/644 |
| 5,202,795 | 4/1993 | Kashima | 359/645 |
| 5,568,319 | 10/1996 | Kaneko et al. | 359/643 |

FOREIGN PATENT DOCUMENTS 175966  4/1922  United Kingdom.

Primary Examiner—Frank G. Font
Assistant Examiner—Michael P. Stafira
Attorney, Agent, or Firm—Klarquist Sparkman Campbell Leigh & Whinston, LLP

[57] ABSTRACT

Eyepiece lenses are disclosed that provide a wide apparent field of view ($\geq 40°$) and that effectively correct optical aberrations even to the periphery of the apparent field of view. The eyepiece lens comprises, in order from the eye side, a first lens group $G_1$ comprising a positive lens element, a second lens group $G_2$ having positive refractive power and comprising either a positive lens element cemented to a negative lens element, or a negative lens element cemented to a positive lens element, and a third lens group $G_3$ having positive or negative refractive power and comprising a positive lens element cemented to a negative lens element. At least one lens surface is aspherical. The eyepiece lens satisfies any of various quantitative expressions.

13 Claims, 7 Drawing Sheets

EYEPIECE LENS WITH WIDE APPARENT FIELD OF VIEW

FIELD OF THE INVENTION

This invention pertains to eyepiece lenses as used, e.g., in telescopes, microscopes, and the like.

BACKGROUND OF THE INVENTION

Users of optical systems such as telescopes and microscopes increasingly desire that such optical systems be equipped with eyepiece lenses that offer a wide apparent field of view with minimal aberrations. Conventional eyepiece lenses do not satisfactorily fulfill such requirements, especially satisfactory aberration correction to the periphery of the apparent field of view. Thus, further improvement in eyepiece lenses is needed.

In view of the shortcomings of prior-art eyepiece lenses, there is a need for an eyepiece lens that provides a wide apparent field of view with effective correction of various aberrations, including distortion, to the periphery of the field of view of the eyepiece lens.

SUMMARY OF THE INVENTION

The foregoing need is met by the present invention that provides, inter alia, eyepiece lenses that exhibit an apparent field of view of at least 40° and that comprise, in order from the eye side on an optical axis, (1) a first lens group $G_1$ comprising a positive lens element, (2) a second lens group $G_2$ having a positive refracting power and comprising either a positive lens element cemented to a negative lens element, or a negative lens element cemented to a lens element, and (3) a third lens group $G_3$ having either a positive refractive power or a negative refractive power and comprising a positive lens element cemented to a negative lens element. At least one lens surface in the three lens groups is an aspherical surface.

The aspherical surface can be either concave or convex and is preferably either the most eyewise lens surface (facing toward the eye side) or the most objectwise lens surface (facing toward the objective side) in the first lens group, but can be either the most eyewise lens surface (facing toward the eye side) or the most objectivewise lens surface (facing toward the objective side) of either the second or third lens group. The aspherical surface also preferably has a peripheral curvature radius that is less than the apical curvature radius if the aspherical surface is concave, and greater than the apical curvature radius if the aspherical surface is convex. The aspherical surface(s) preferably has a profile defined by the expression:

$$x = \frac{C_0 y^2}{1 + \sqrt{1 - kC_0^2 y^2}} + \sum_{i=2}^{N} C_{2i} y^{2i} \quad (N \geq 2) \quad (D)$$

wherein x is a distance measured along the optical axis from the apex of the aspherical surface, y is a distance measured perpendicular to the optical axis from the apex of the aspherical surface, $C_0$ is the apical curvature ($C_0 = 1/R$ wherein R is the apical curvature radius) of the aspherical surface, κ is a conical constant, and $C_{2i}$ is the $2i^{th}$-order ($i \geq 2$) aspherical surface coefficient.

In the foregoing aspherical profile, the fourth-order aspherical surface coefficient $C_4$ preferably satisfies the following:

$$|C_4| < 1 \times 10^{-3}$$

and more preferably the following:

$$|C_4| > 1 \times 10^{-8}$$

In an eyepiece lens according to the present invention in which an aspherical surface is provided as the most eyewise lens surface (facing toward the eye side) or the most objectivewise lens surface (facing toward the objective side) in any of the first, second, or third lens groups, the following expression is preferably satisfied:

$$0.001 < |d_x/h| < 2.0$$

wherein h is the distance perpendicularly from the optical axis to a point of incidence of a most off-axis ray on the aspherical surface; and $d_x$ is the distance, at h parallel to the optical axis, from the aspherical surface to a spherical surface corresponding to the apical curvature radius of the aspherical surface. More preferably, if the aspherical surface as described above is located in the first lens group, the eyepiece lens satisfies the following:

$$0.001 < |d_x/h| < 0.84$$

If the aspherical surface described above is located in the second or third lens group, the eyepiece lens more preferably satisfies the following:

$$0.001 < |d_x/h| < 0.45$$

If the aspherical surface as described above is located in the first lens group, the eyepiece lens also preferably satisfies the following:

$$(r_b + r_a)/(r_b - r_a) < 0$$

wherein $r_a$ is the apical curvature radius of the most eyewise lens surface of the first lens group $G_1$, and $r_b$ is the apical curvature radius of the most objectivewise lens surface of the first lens group $G_1$.

Other features and advantages of the invention will be apparent from the following detailed description and drawings.

DETAILED DESCRIPTION

As used herein, "objectivewise" refers to an orientation facing an objective lens with which the subject eyepiece lens is used, and the "objective side" of the eyepiece lens is the axial region that normally would be situated between the eyepiece lens and the objective lens. "Eyewise" refers to an orientation facing a user's eye, and the "eye side" of the eyepiece lens is the axial region that normally would be situated between the eyepiece lens and the user's eye. "E.P." means eye point. In the optical diagrams of FIGS. 1, 3, 5, 7, 9, 11, and 13, the eye side is on the left, and the objective side is on the right.

Figure 1:
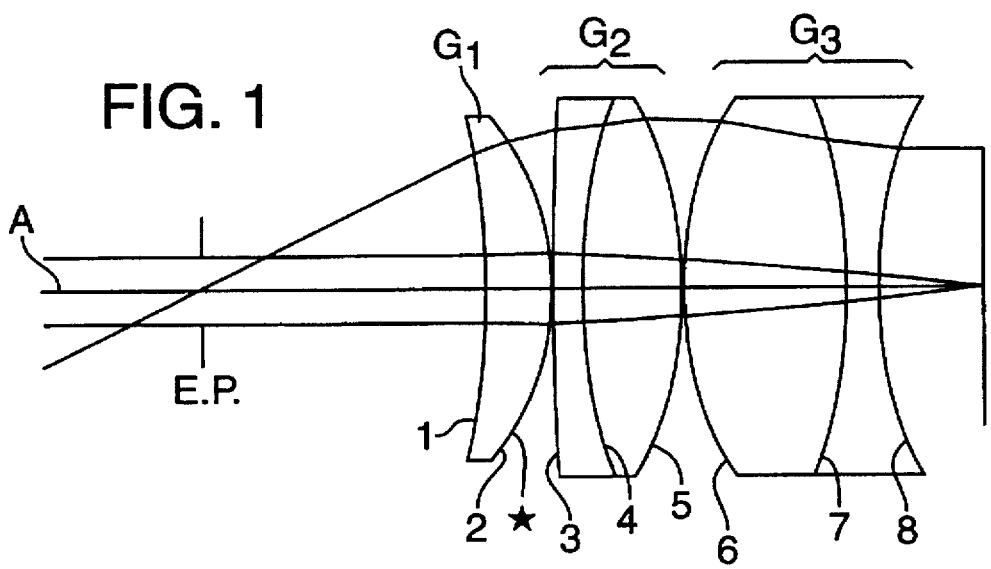
FIG. 1 is an optical diagram showing general features of an eyepiece lens according to the present invention, as well as specific features of Example Embodiment 1.
Figure 2:
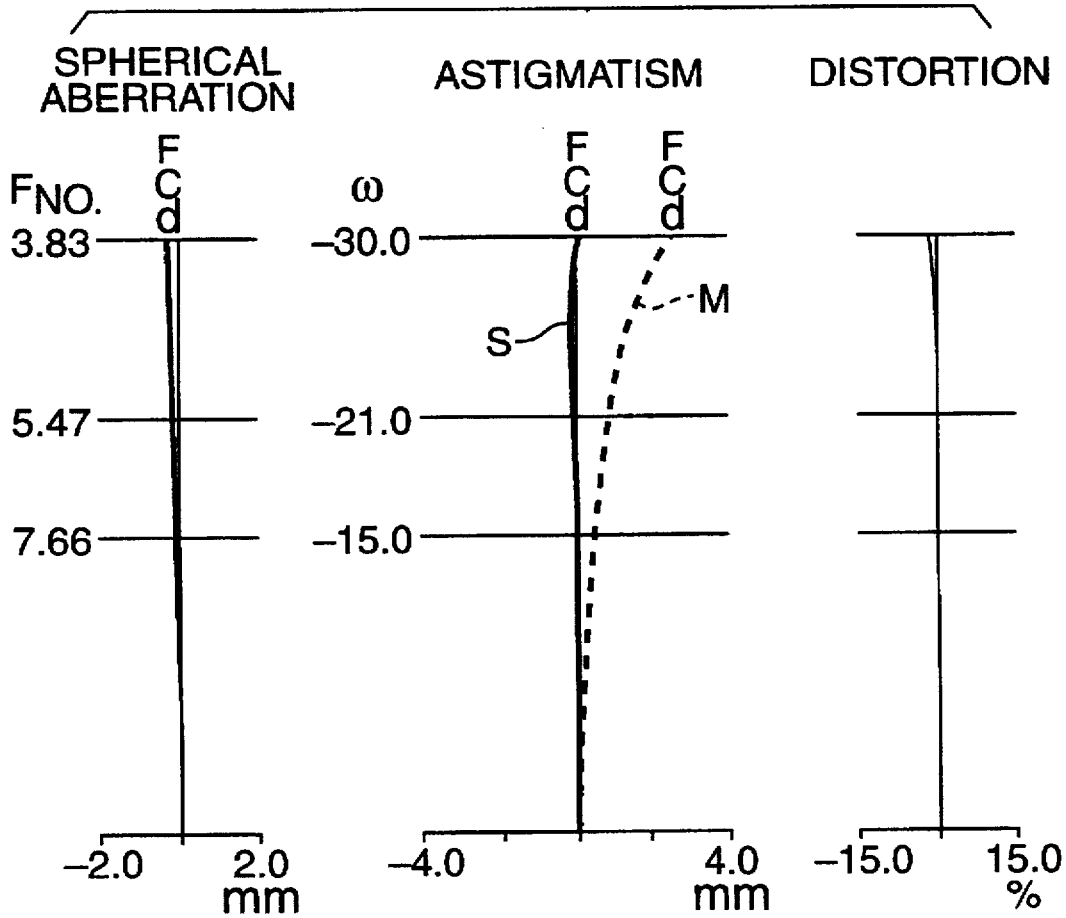
FIG. 2 provides plots of spherical aberration, astigmatism, and distortion for Example Embodiment 1.

According to the present invention, an eyepiece lens is provided that exhibits, inter alia, an apparent field of view of 40° or more. Referring generally to FIG. 1, the eyepiece lens comprises, in order from the eye side, a first lens group $G_1$, a second lens group $G_2$, and a third lens group $G_3$, all situated on an optical axis A. The first lens group $G_1$ comprises a positive lens element. The second lens group $G_2$ has positive refractive power and comprises either a positive lens element cemented to a negative lens element, or a negative lens element cemented to a positive lens element. The third lens group $G_3$ can have positive or negative refractive power, and comprises a positive lens element cemented to a negative lens element.

Preferably, at least one of the lens elements of the eyepiece lens has an aspherical surface. If the aspherical surface is concave, then the curvature radius at the perimeter of the surface is preferably less than the curvature radius at the apex of the surface; conversely, if the aspherical surface is convex, then the curvature radius at the perimeter of the surface is preferably greater than the curvature radius at the apex of the surface. Such an aspherical surface provides, inter alia, an improved distortion correction while preserving a sufficiently long eye relief; i.e., a comfortable axial distance from the most eyewise lens surface to the eye point is maintained.

Figure 15:
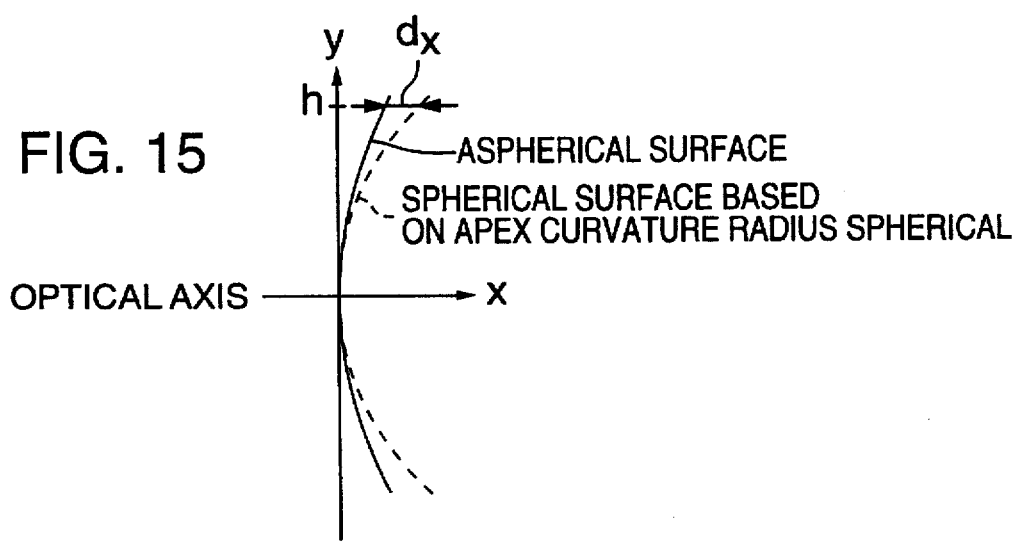
FIG. 15 is an explanatory diagram depicting the profile of the aspherical surface of FIG. 13.

With respect to the first lens group $G_1$, whenever the most eyewise lens surface (facing toward the eye side) of the group and/or the most objectivewise lens surface (facing toward the objective side) of the group is an aspherical surface, the aspherical surface(s) preferably satisfies the following Conditional Expression:

$$0.001 < |d_x/h| < 2.00 \tag{A_1}$$

wherein, as shown in FIG. 15, h is the distance, perpendicularly from the optical axis, of the point of incidence of the most off-axis incident ray on the aspherical surface, and $d_x$ is the axial distance, at h parallel to the optical axis, from the aspherical surface to a spherical surface corresponding to the apical curvature radius of the aspherical surface.

With respect to the second lens group $G_2$ or the third lens group $G_3$, whenever the most eyewise lens surface (facing toward the eye side) of the group and/or the most objectivewise lens surface (facing toward the objective side) of the group is an aspherical surface, the aspherical surface(s) preferably satisfies the following Conditional Expression:

$$0.001 < |d_x/h| < 2.00 \tag{A_2}$$

wherein $d_x$ and h are as defined above.

With respect to Conditional Expressions $(A_1)$ and $(A_2)$, if $|d_x/h|$ should fall below the stated lower limit, then correction of distortion would be insufficient for the eyepiece lens. If the upper limit should be exceeded, then distortion would be over-corrected.

To achieve even better correction of distortion, Conditional Expression $(A_1)$ more preferably has an upper limit of 0.84, and Conditional Expression $(A_2)$ more preferably has an upper limit of 0.45.

Further with respect to the first lens group $G_1$, whenever the most eyewise lens surface of the group and/or the most objectivewise lens surface of the group is an aspherical surface, the aspherical surface(s) preferably also satisfies the following Conditional Expression:

$$(r_b+r_a)/(r_b-r_a)<0 \tag{B}$$

wherein $r_a$ is the apical curvature radius of the most eyewise lens surface of the first lens group $G_1$, and $r_b$ is the apical curvature radius of the most objectivewise lens surface of the first lens group $G_1$.

The aspherical surface(s) preferably has a profile defined by the expression:

$$x = \frac{C_0 y^2}{1+\sqrt{1-kC_0^2 y^2}} + \sum_{i=2}^{N} C_{2i} y^{2i} \quad (N \geq 2) \tag{C}$$

wherein x is a distance measured along the optical axis from the apex of the aspherical surface, y is a distance measured perpendicular to the optical axis from the apex of the aspherical surface, $C_0$ is the apical curvature ($C_0=1/R$ wherein R is the apical curvature radius) of the aspherical surface, $\kappa$ is a conical constant, and $C_{2i}$ is the $2i^{th}$-order ($i \geq 2$) aspherical surface coefficient. The fourth-order aspherical surface coefficient preferably satisfies the following Conditional Expression:

$$|C_4|<1\times10^{-3} \tag{D}$$

It is more preferred that the fourth-order aspherical surface coefficient $C_4$ fulfill the following Conditional Expression:

$$|C_4|>1\times10^{-8} \tag{D'}$$

Figure 13:
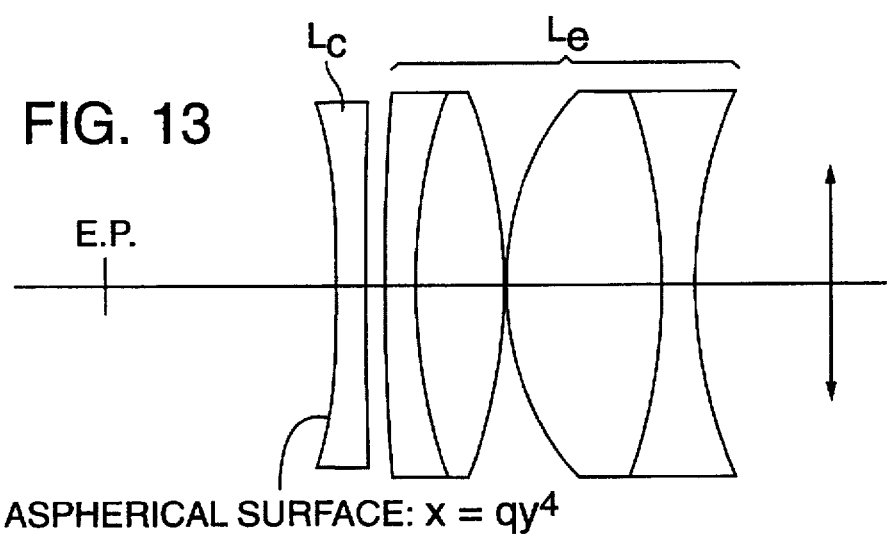
FIG. 13 is an explanatory diagram showing an eyepiece structure that includes an aspherical surface provided on an aspherical corrective plate disposed on the eye side. The aspherical surface has a profile $x=qy^4$ for correcting pupil aberration.

To explain Conditional Expressions (D) and (D'), a case is considered in which pupil aberration (distortion) is corrected by adding to the eyepiece lens an aspherical surface (as provided, e.g., by a corrective plate) having a profile corresponding to the fourth-order aspherical term ($x=C_4 y^4$) in Expression (C). FIG. 13 shows a corrective plate $L_c$ having such an eyewise aspherical profile and being situated on the eye side of the eyepiece lens $L_e$. The eyepiece lens $L_e$ comprises spherical lens elements. Pupil aberration (distortion) of the eyepiece lens $L_e$ is corrected by the aspherical corrective plate $L_c$.

Figure 14:
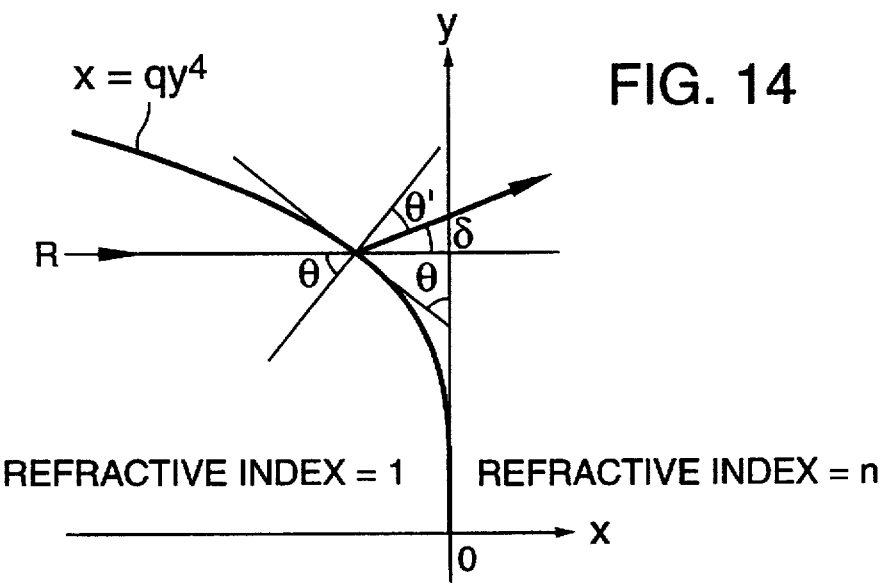
FIG. 14 is an explanatory diagram showing a ray passing through the aspherical surface of FIG. 13.

As mentioned above and as shown in FIG. 14, the transverse surface profile of the corrective plate $L_c$ is expressed by the following equation:

$$x=qy^4 \tag{1}$$

wherein q is a constant. If one considers a ray R impinging at a point on the aspherical surface, a tangent to the impingement point is oriented at an angle $\theta$ relative to the ray R. The angle $\theta$ is determined by differentiating Equation (1), yielding the expression:

$$\theta = dx/dy = 4qy^3$$

Where n is the refractive index of the corrective plate $L_c$, $\theta'$ is the angle of the ray R (relative to the tangent) after the ray has passed through the aspherical surface of the corrective plate $L_c$, and $\delta$ is the displacement angle of the ray R (relative to the incident ray) caused by the aspherical surface, the displacement angle $\delta$ is expressed by the following equation:

$$\delta = \theta - \theta' = [1-(1/n)]\theta = 4[1-(1/n)]qy^3 \qquad (2)$$

Any pupil aberration (distortion) $\Delta S'$ imparted by the eyepiece lens $L_e$ is expressed in the domain of tertiary aberration as follows:

$$\Delta S' = Ay^2 \qquad (3)$$

wherein A is a constant and y is the height, from the optical axis, of the corresponding light ray entering the eyepiece lens (FIG. 15).

Where $\beta$ is the magnification at the image of the pupil of the eyepiece lens, $\Delta S'$ can also be expressed as follows:

$$\Delta S' = -\beta^2 \Delta S \qquad (4)$$

When the distance S to the incident pupil is sufficiently larger than the focal length of the eyepiece lens, the following equation is true by the sine theorem:

$$\Delta S = -S^2 \delta/y = -4[1-(1/n)]qS^2y^2 \qquad (5)$$

Substituting Equation (3) into Equation (4) yields:

$$Ay^2 = -\beta^2 \Delta S$$

Then, by substituting equation (5) into the foregoing, $$A = 4[1-(1/n)]\beta^2 qS^2 \qquad (6)$$

Since distortion tends to decrease along with pupil aberration, if a value of q is selected that will satisfy Equation (6), then an eyepiece lens can be obtained without any pupil aberration, i.e., distortion, overall.

Solving Equation (6) for q and substituting into Equation (1) yields the following:

$$x = qy^4 = [A/(4[1-(1/n)]\beta^2 S^2)]y^4 \qquad (7)$$

Since $\beta = S'/S$ (wherein S' is the eye relief of the eyepiece lens), Equation (7) can be rewritten as follows:

$$x = [A/(4[1-(1/n)]S'^2)]y^4 \qquad (8)$$

The constant q in the foregoing corresponds to the coefficient $C_4$ of $y^4$ in Equation (C).

Also in the foregoing, the eye relief S' is generally about 10 to 30 mm. The constant A will differ depending on, for example, the construction, incident pupil position, and focal length, of the eyepiece lens. But, if $C_4$ is made to be in the range of Conditional Expression (D), then correction of pupil aberration can be effectively accomplished for common constants A in the eyepiece lens. If effective astigmatism correction is desired in addition to distortion correction, this can be accomplished by satisfying Conditional Expression (D').

If $C_4$ is less than the lower limit of Conditional Expression (D'), then correction of pupil aberration is insufficient. Conversely, if $C_4$ exceeds the upper limit of Condition (D), then pupil aberration is overcorrected.

In the foregoing, the corrective plate $L_c$ is situated on the eye side of the eyepiece lens. However, similar results can be obtained if the corrective plate were positioned on the objective side of the eyepiece lens.

Next, considering the case in which the apical curvature $C_0$ (i.e., the coefficient $y^2$ of the apical curvature) is not zero, the aspherical shape is expressed by the following equation:

$$x = py^2 + qy^4 \qquad (9)$$

As in the foregoing, the angle $\theta$ of the tangent to an impinging ray and the pupil aberration $\Delta S'$ are found as follows:

$$\theta = 2py + 4py^3 \qquad (10)$$

$$\Delta S' = 2[1-(1/n)]\beta^2 pS^2 + 4[1-(1/n)]\beta^2 qS^2 y^2 \qquad (11)$$

The second term on the right in Equation (11) is the same as when the apical curvature $C_0$ is 0 (zero). The first term on the right in Equation (11) is a constant term that does not include $y^2$; i.e., it is a term that expresses the movement of the image point resulting from a surface of an apical curvature $C_0$, and has no relationship to the correction of pupil aberration. Consequently, even if a term that corresponds to the $y^2$ term (2-dimensional curved plane) is included in the equation defining the shape of the corrective plate, that is, even if the corrective plate is a lens with a refractive power, since only the $y^4$ term will have any effect on the correction of pupil aberration, pupil aberration will be effectively corrected as long as the value for $C_4$ is in the range of Conditional Expression (D), and preferably in the range of Conditional Expression (D').

The foregoing description applies to the case in which only the term $y^4$ is given as the shape of the corrective plate $L_c$, or the case in which as much as the degree of $y^4$ is given. But, this is because pupil aberration is completely corrected in the domain of tertiary aberration only by the term $y^4$. However, since one departs from the domain of tertiary aberration to the extent that one widens the field angle of an eyepiece lens, it becomes impossible to completely correct pupil aberration with an aspherical corrective plate as described above which is expressed only by the term $y^4$. In this case, a higher order corrective term needs to be added, besides the $y^4$ term, to the aspherical profile of the corrective plate $L_c$.

EXAMPLE EMBODIMENTS OF THE INVENTION

FIGS. 1, 3, 5, 7, and 9 show optical configurations for Example Embodiments 1–5, respectively, of this invention. Each Example Embodiment, and the Comparison Example (FIG. 11) is comprised, in order from the eye side, of a first lens group $G_1$, a second lens group $G_2$, and a third lens group $G_3$. The first lens group comprises a single positive lens component. The second lens group $G_2$ has a positive refractive power and comprises either a positive lens element cemented to a negative lens element, or a negative lens element cemented to a positive lens element. The third lens group $G_3$ can have either a positive refractive power or a negative refractive power, and comprises a cemented lens including a positive lens element and a negative lens element.

Figure 3:
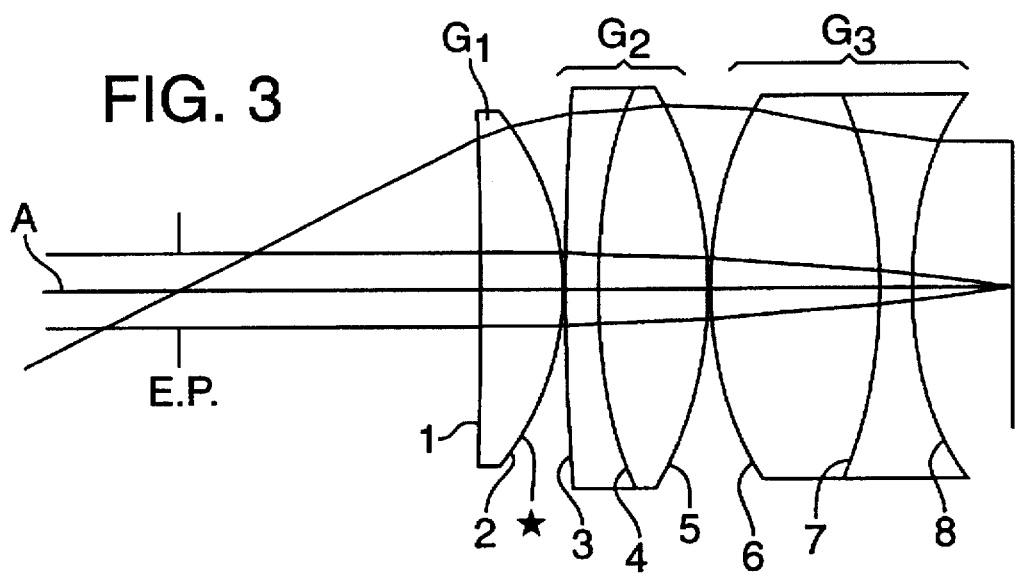
FIG. 3 is an optical diagram showing specific features of Example Embodiment 2.
Figure 4:
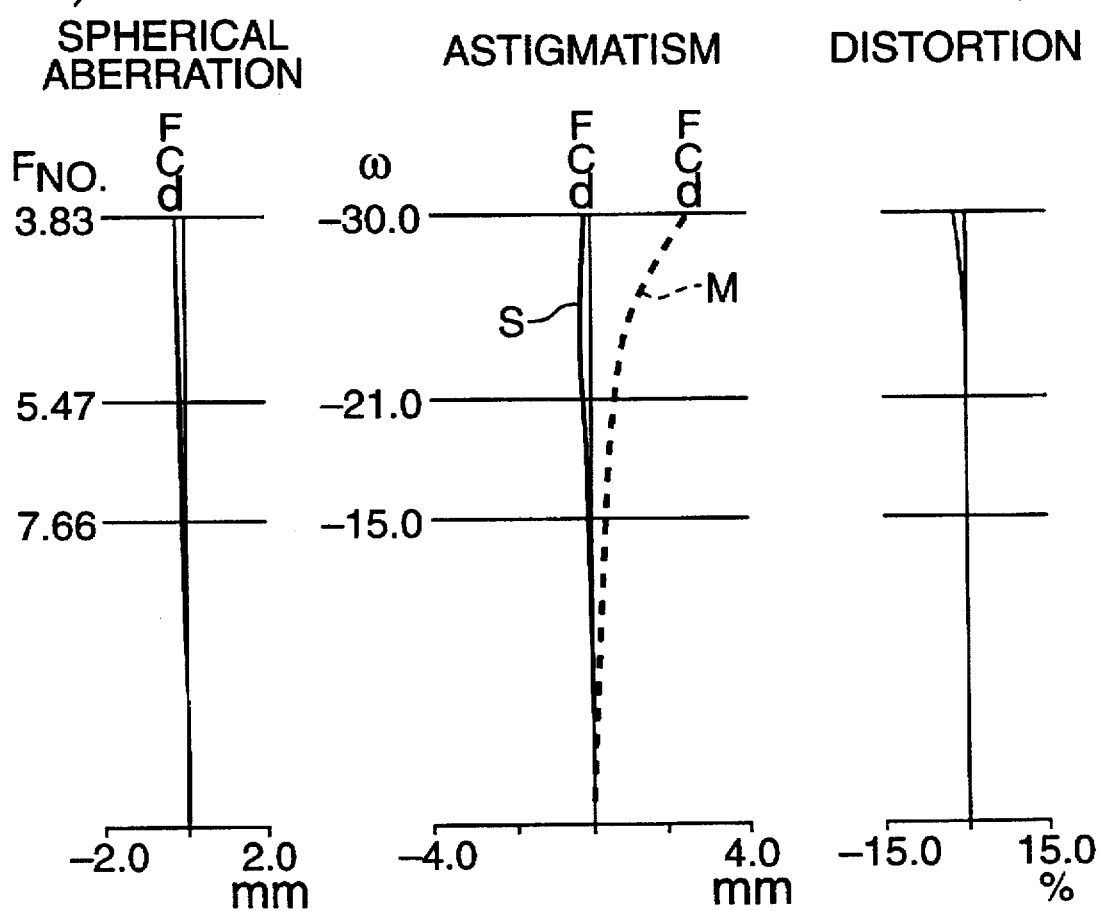
FIG. 4 provides plots of spherical aberration, astigmatism, and distortion for Example Embodiment 2.
Figure 5:
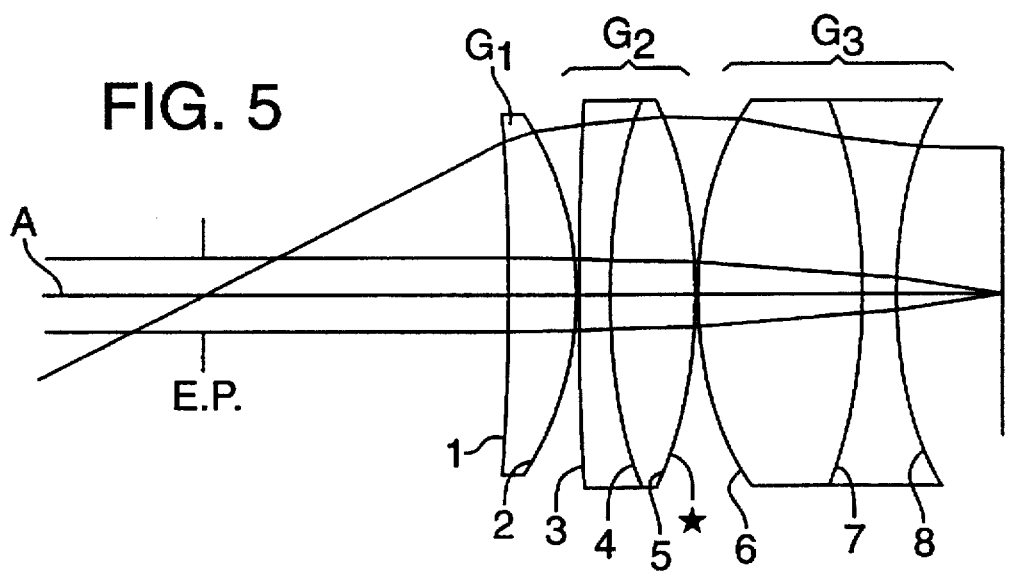
FIG. 5 is an optical diagram showing specific features of Example Embodiment 3.
Figure 6:
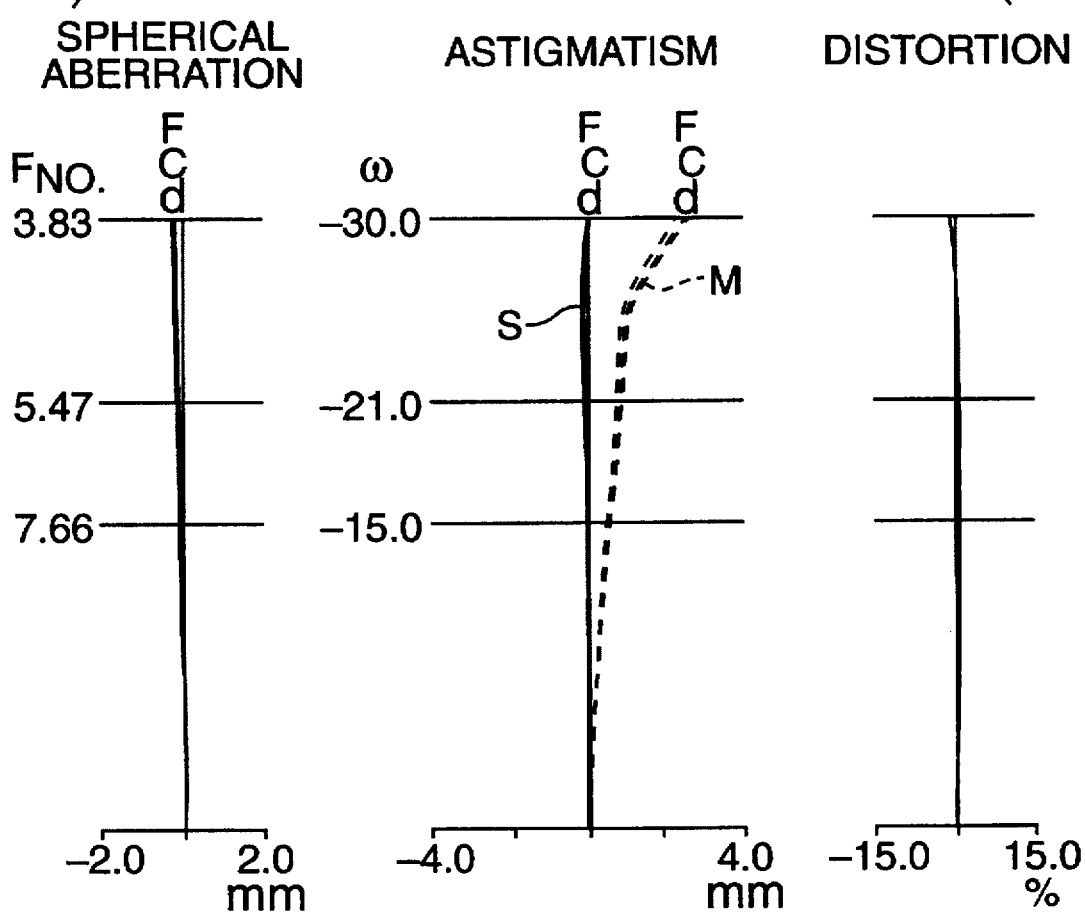
FIG. 6 provides plots of spherical aberration, astigmatism, and distortion for Example Embodiment 3.
Figure 9:
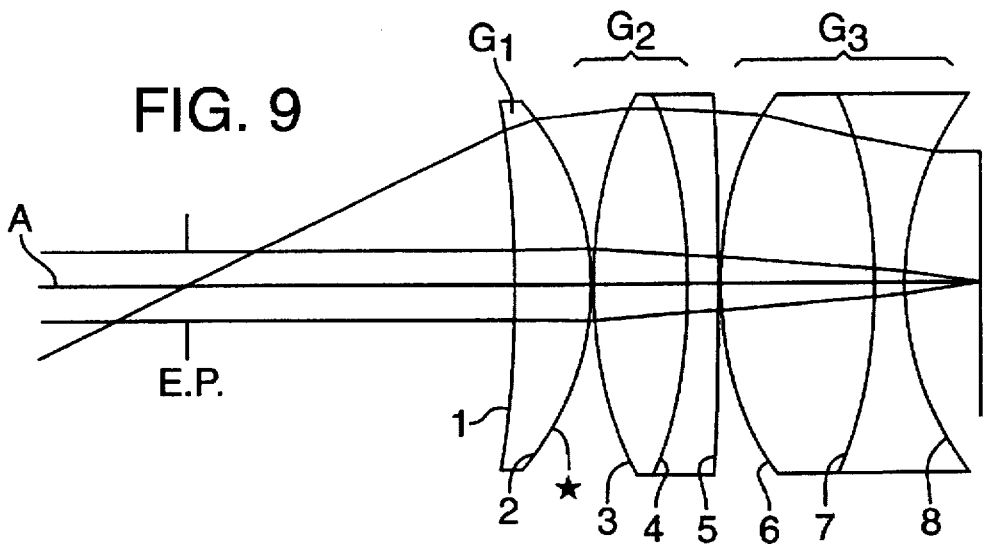
FIG. 9 is an optical diagram showing specific features of Example Embodiment 5.
Figure 10:
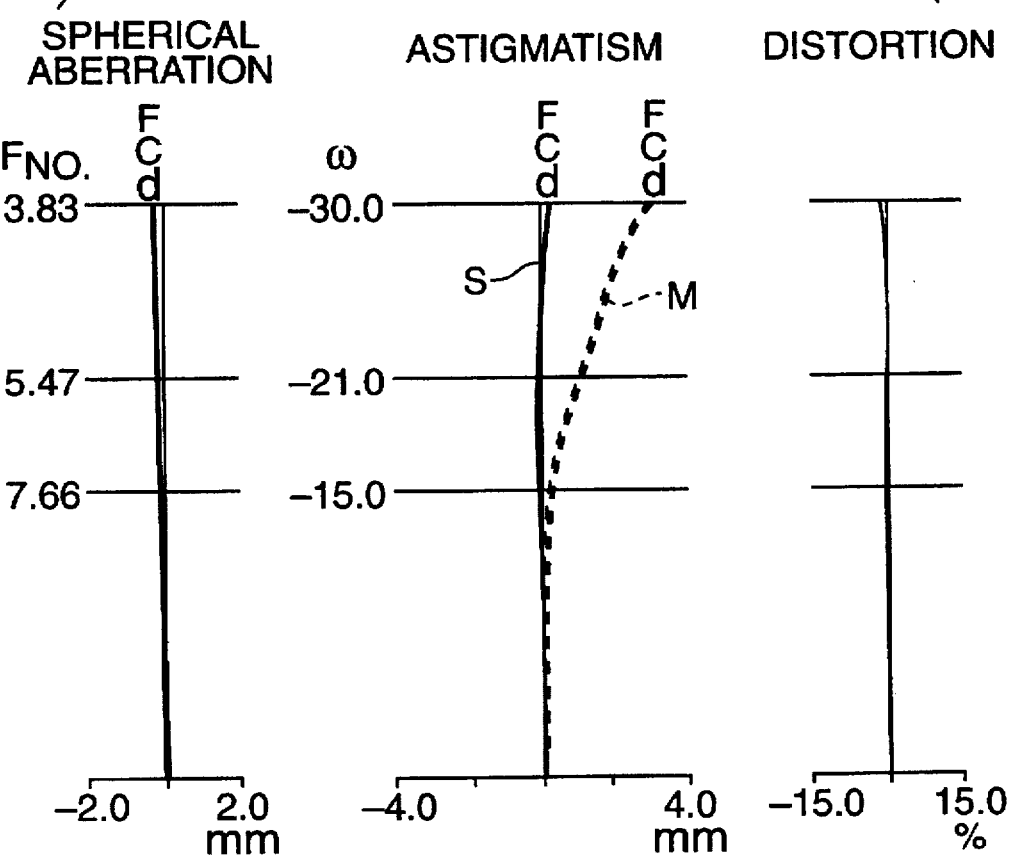
FIG. 10 provides plots of spherical aberration, astigmatism, and distortion for Example Embodiment 5.
Figure 11:
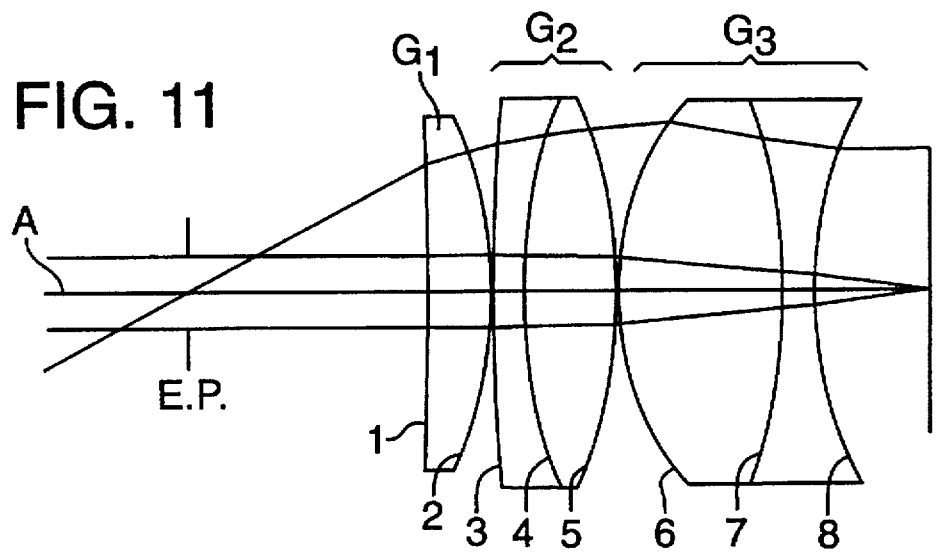
FIG. 11 is an optical diagram showing specific features of the Comparison Example.

In Example Embodiments 1, 2, and 5, an aspherical surface is included as the most objectivewise lens surface of the first lens group $G_1$ (see FIGS. 1, 3, and 9, respectively).

Further with respect to the first lens group $G_1$, optical glass is used as the material for the first lens group $G_1$ in Example Embodiments 1 and 3–5 and in the Comparison Example. A polymeric optical material is used as the material for the first lens group $G_1$ in Example Embodiment 2.

With respect to the second lens group $G_2$, the cemented lens in Example Embodiments 1–4 includes, from the eye side, a negative lens element cemented to a positive lens element (see FIGS. 1, 3, 5, and 7, respectively). In Example Embodiment 5, in contrast, the cemented lens includes, from the eye side, a positive lens element cemented to a negative lens element (see FIG. 9).

Figure 7:
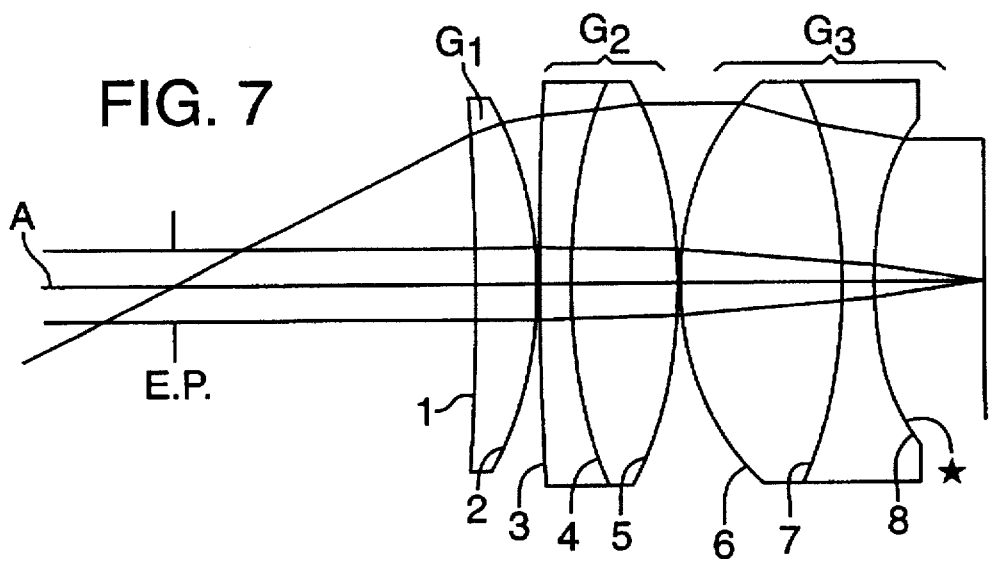
FIG. 7 is an optical diagram showing specific features of Example Embodiment 4.

In addition, the most objectivewise lens surface in the second lens group $G_2$ is aspherical in Example Embodiment 3 (FIG. 5), whereas the most objectivewise lens surface of the third lens group $G_3$ is aspherical in Example Embodiment 4 (FIG. 7). The Comparison Example (FIG. 11) includes no aspherical surfaces.

The specifications for Example Embodiments 1–5 are set forth in Tables 1–5, respectively, and the specifications for the Comparison Example are set forth in Table 6, below. In each Table, the first column lists lens surfaces in order from the eye side; the second column, labeled "r", lists corresponding curvature radii of the lens surfaces; the third column, labeled "d", lists the thicknesses of the corresponding lens elements or the axial interfacial distances between adjacent lens surfaces; the fourth column, labeled "n", lists the refractive indices of the corresponding lens elements; the fifth column, labeled "ν", lists the Abbe numbers of the corresponding lens elements; and the sixth column provides the lens group number in which each corresponding lens element is situated. A "★" adjacent a lens surface number in the first column denotes that the respective lens surface is aspherical; and the curvature radius r provided for the aspherical surface represents the curvature radius at the apex of the aspherical surface. All of the aspherical surfaces are radially symmetrical and are profiled according to Conditional Expression (C), in which N=5.

Each of Tables 1–5 includes a corresponding Aspherical Surface Data table in which the first column provides the lens surface number that is aspherical in the particular Example Embodiment; the second column, labeled "κ", provides the corresponding conical constant; and the third column lists the $C_4$, $C_6$, $C_8$, and $C_{10}$ coefficients (i.e., the 4th-order, 6th-order, 8th-order, and 10th-order aspherical surface coefficients, respectively).

Each of Tables 1–5 also includes data pertaining to Conditional Expressions ($A_1$) and ($A_2$) for the corresponding Example Embodiment. Tables 1, 2, and 5 also include data pertaining to Conditional Expression (B) for Example Embodiments 1, 2, and 5, respectively.

TABLE 1

(Example Embodiment 1)

Overall Specifications

Apparent field of view: 60°
Focal length: 18.3 mm
Eye relief: 18.5 mm

Lens Specifications

| No. | r (mm) | d (mm) | n | ν | Lens Group |
|---|---|---|---|---|---|
| 1 | −52.7 | 4.0 | 1.713 | 53.9 | $G_1$ |
| *2 | −18.0 | 0.2 | | | |
| 3 | 225.7 | 2.0 | 1.805 | 25.5 | $G_2$ |
| 4 | 40.2 | 6.0 | 1.620 | 60.4 | $G_2$ |
| 5 | −27.6 | 0.2 | | | |
| 6 | 26.7 | 10.5 | 1.620 | 60.4 | $G_3$ |
| 7 | −38.9 | 2.0 | 1.805 | 25.5 | $G_3$ |
| 8 | 30.3 | | | | |

Aspherical Surface Data

| No. | κ | Coefficient |
|---|---|---|
| 2 | 0.10 | $C_4 = 0.96 \times 10^{-6}$ |
| | | $C_6 = 0.14 \times 10^{-8}$ |
| | | $C_8 = 0$ |
| | | $C_{10} = -0.13 \times 10^{-12}$ |

Conditional Expressions

($A_1$, $A_2$): $kd_x/hl = 0.028$
(B): $(r_b + r_a)/(r_b - r_a) = -2.05$

TABLE 2

(Example Embodiment 2)

Overall Specifications

Apparent field of view: 60°
Focal length: 18.3 mm
Eye relief: 19.0 mm

Lens Specifications

| No. | r (mm) | d (mm) | n | ν | Lens Group |
|---|---|---|---|---|---|
| 1 | −309.3 | 5.2 | 1.491 | 57.6 | $G_1$ |
| *2 | −16.0 | 0.2 | | | |
| 3 | 225.7 | 2.0 | 1.805 | 25.5 | $G_2$ |
| 4 | 40.2 | 7.0 | 1.620 | 60.4 | $G_2$ |
| 5 | −27.6 | 0.2 | | | |
| 6 | 26.7 | 10.5 | 1.620 | 60.4 | $G_3$ |
| 7 | −38.9 | 2.0 | 1.805 | 25.5 | $G_3$ |
| 8 | 26.1 | | | | |

Aspherical Surface Data

| No. | κ | Coefficient |
|---|---|---|
| 2 | −0.52 | $C_4 = -0.40 \times 10^{-5}$ |
| | | $C_6 = -0.50 \times 10^{-7}$ |
| | | $C_8 = 0.39 \times 10^{-9}$ |
| | | $C_{10} = -0.18 \times 10^{-12}$ |

Conditional Expressions

($A_1$, $A_2$): $kd_x/hl = 0.670$
(B): $(r_b + r_a)/(r_b - r_a) = -1.11$

TABLE 3

(Example Embodiment 3)

Overall Specifications

Apparent field of view: 60°
Focal length: 18.3 mm
Eye relief: 19.8 mm

Lens Specifications

| No. | r (mm) | d (mm) | n | ν | Lens Group |
|---|---|---|---|---|---|
| 1 | −404.6 | 4.5 | 1.713 | 53.9 | $G_1$ |
| 2 | −23.0 | 0.2 | | | |
| 3 | 225.7 | 2.0 | 1.805 | 25.5 | $G_2$ |
| 4 | 40.0 | 6.0 | 1.620 | 60.4 | $G_2$ |
| *5 | −31.2 | 0.2 | | | |
| 6 | 25.5 | 10.5 | 1.620 | 60.4 | $G_3$ |
| 7 | −37.7 | 2.0 | 1.805 | 25.5 | $G_3$ |
| 8 | 29.0 | | | | |

Aspherical Surface Data

| No. | κ | Coefficient |
|---|---|---|
| 5 | −4.29 | $C_4 = 0.27 \times 10^{-5}$ |
| | | $C_6 = -0.551 \times 10^{-8}$ |
| | | $C_8 = -0.37 \times 10^{-10}$ |
| | | $C_{10} = -0.13 \times 10^{-12}$ |

Conditional Expressions (B): $kd_x/hl = 0.035$

TABLE 4

(Example Embodiment 4)

Overall Specifications

Apparent field of view: 60°
Focal length: 18.3 mm
Eye relief: 19.3 mm

Lens Specifications

| No. | r (mm) | d (mm) | n | ν | Lens Group |
|---|---|---|---|---|---|
| 1 | −158.4 | 4.0 | 1.713 | 53.9 | $G_1$ |
| 2 | −23.0 | 0.2 | | | |
| 3 | 225.7 | 2.0 | 1.805 | 25.5 | $G_2$ |
| 4 | 40.0 | 7.0 | 1.620 | 60.4 | $G_2$ |
| 5 | −31.2 | 0.2 | | | |
| 6 | 19.8 | 10.5 | 1.620 | 60.4 | $G_3$ |
| 7 | −37.7 | 2.0 | 1.805 | 25.5 | $G_3$ |
| *8 | 32.0 | | | | |

Aspherical Surface Data

| No. | κ | Coefficient |
|---|---|---|
| 8 | 0.50 | $C_4 = 0.39 \times 10^{-4}$ |
| | | $C_6 = 0$ |
| | | $C_8 = 0$ |
| | | $C_{10} = 0.67 \times 10^{-11}$ |

Conditional Expressions (B): $kd_x/hl = 0.043$

TABLE 5

(Example Embodiment 5)

Overall Specifications

Apparent field of view: 60°
Focal length: 18.3 mm
Eye relief: 22.1 mm

Lens Specifications

| No. | r (mm) | d (mm) | n | ν | Lens Group |
|---|---|---|---|---|---|
| 1 | −76.9 | 5.3 | 1.713 | 53.9 | $G_1$ |
| *2 | −18.0 | 0.2 | | | |
| 3 | 36.7 | 6.5 | 1.620 | 60.4 | $G_2$ |
| 4 | 40.2 | 2.0 | 1.805 | 25.5 | $G_2$ |
| 5 | −225.7 | 0.2 | | | |
| 6 | 26.7 | 10.5 | 1.620 | 60.4 | $G_3$ |
| 7 | −38.9 | 2.0 | 1.805 | 25.5 | $G_3$ |
| 8 | 23.8 | | | | |

Aspherical Surface Data

| No. | κ | Coefficient |
|---|---|---|
| 2 | 0.10 | $C_4 = 0.94 \times 10^{-5}$ |
| | | $C_6 = 0.14 \times 10^{-8}$ |
| | | $C_8 = 0.20 \times 10^{-9}$ |
| | | $C_{10} = -0.10 \times 10^{-11}$ |

Conditional Expressions ($A_1$, $A_2$): $kd_x/hl = 0.042$
(B): $(r_b + r_a)/(r_b - r_a) = -1.61$

TABLE 6

(Comparison Example)

Overall Specifications

Apparent field of view: 60°
Focal length: 18.3 mm
Eye relief: 14.6 mm

Lens Specifications

| No. | r (mm) | d (mm) | n | ν | Lens Group |
|---|---|---|---|---|---|
| 1 | −182.3 | 4.0 | 1.713 | 53.9 | $G_1$ |
| 2 | −27.0 | 0.2 | | | |
| 3 | 225.7 | 2.0 | 1.805 | 25.5 | $G_2$ |
| 4 | 40.0 | 6.0 | 1.620 | 60.4 | $G_2$ |
| 5 | −31.2 | 0.2 | | | |
| 6 | 20.4 | 10.5 | 1.620 | 60.4 | $G_3$ |
| 7 | −37.7 | 2.0 | 1.805 | 25.5 | $G_3$ |
| 8 | 32.0 | | | | |

FIGS. 2, 4, 6, 8, and 10 are plots of spherical aberration, astigmatism, and distortion for each of Example Embodiments 1–5, respectively. Plots of these aberrations for the Comparison Example are provided in FIG. 12. Each aberration is determined by rays traced from the eye side. In each astigmatism plot, the dashed line represents the meridional image surface and the solid line represents the sagittal image surface. $F_{NO}$ in the figures represents the F number, and ω represents half the apparent field of view.

Figure 8:
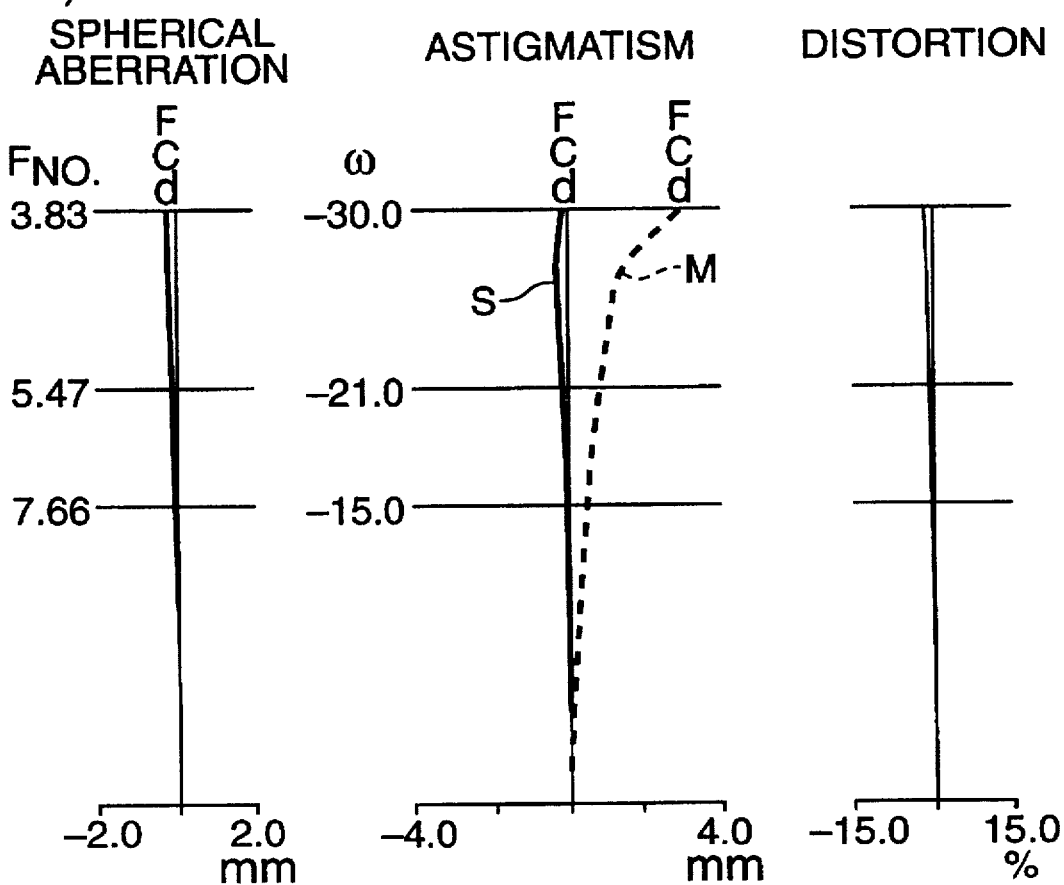
FIG. 8 provides plots of spherical aberration, astigmatism, and distortion for Example Embodiment 4.
Figure 12:
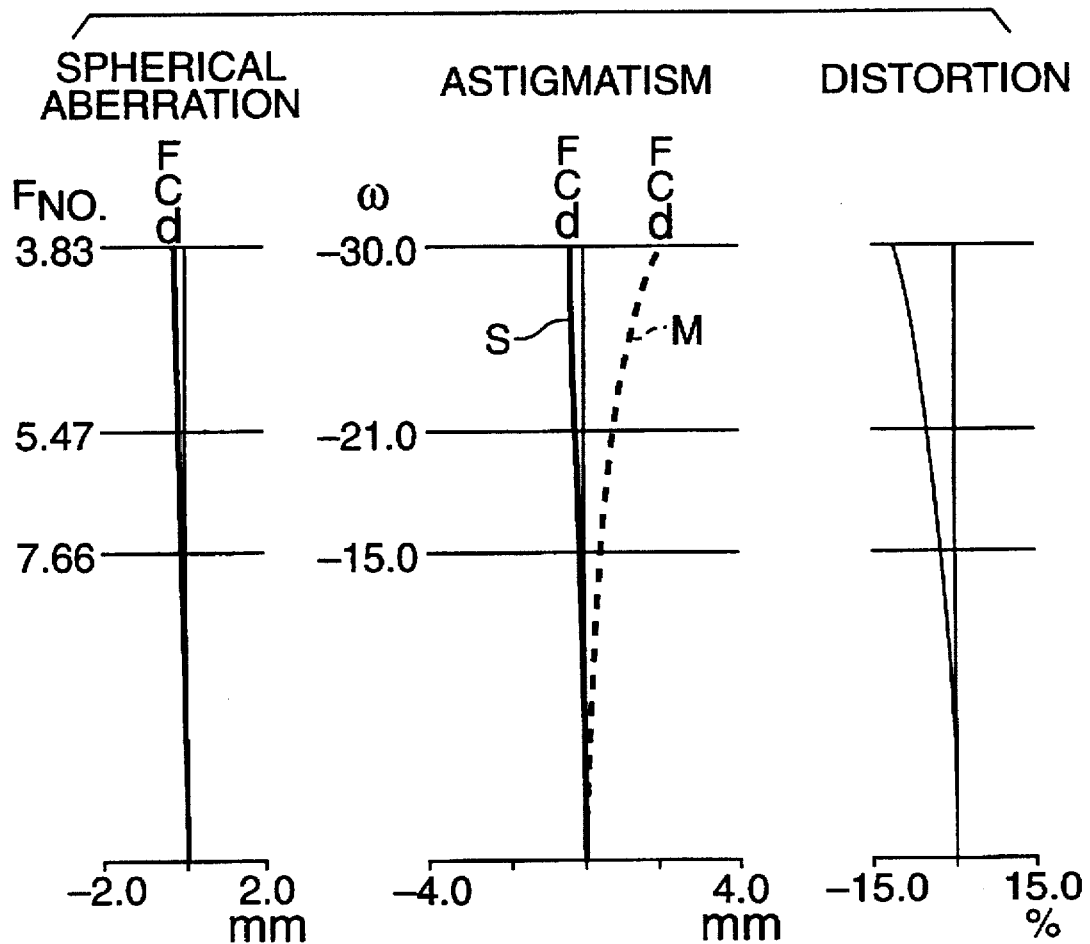
FIG. 12 provides plots of spherical aberration, astigmatism, and distortion for the Comparison Example.

When any of FIGS. 2, 4, 6, and 10 is compared with FIG. 12, it can be seen that distortion is greatly in Example Embodiments 1, 2, 3, and 5 compared to the Comparison Example due to the effects of using aspherical surfaces in which the curvature radius is greater at the perimeter of the lens face than the curvature radius at its apex. Similarly, when FIG. 8 and FIG. 12 are compared, it can be seen that the distortion is greatly improved in Example Implementation 4 compared with the Comparison Example due to the effects of using an aspherical surface in which the curvature radius is smaller at the perimeter of the lens face than the curvature radius at its apex.

Furthermore, when Tables 1 through 5 are compared with Table 6, it can be seen that, while the eye relief in the eyepiece lens of the Comparison Example, in which only spherical lenses are used, is approximately 80% of the focal length of the eyepiece lens, the eye relief in the various Example Embodiments is substantially longer, being greater than the focal length of the eyepiece lens. In addition, as can be seen from the Example Embodiments, either optical glass or an optical polymeric material may be used to fabricate the lens elements.

By thus using an aspherical surface in each of the various Example Embodiments, effective correction of distortion has further been realized by fulfilling the various quantitative conditions. In addition, even though in the various Example Embodiments the apparent field of view was 60°, it is possible to maintain good optical properties even when the lens diameter is increased to provide an apparent field of view of as much as 70°.

Whereas the present invention has been described in connection with preferred embodiments and Example Embodiments, it will be understood that the invention is not limited to those embodiments or Example Embodiments. On the contrary, the invention is intended to encompass all alternatives, modifications, and equivalents that may be included within the spirit and scope of the invention as defined by the appended claims.

What is claimed is:

1. An eyepiece lens, comprising in order from the eye side on an optical axis:

(a) a first lens group $G_1$ comprising a positive lens element; a second lens group $G_2$ having a positive refractive power and comprising either a positive lens element cemented to a negative lens element, or a negative lens element cemented to a positive lens element; and a third lens group $G_3$ having either a positive refractive power or a negative refractive power, and comprising a positive lens element cemented to a negative lens element;

(b) at least one lens surface of the lens elements in the three lens groups being an aspherical surface; and (c) the eyepiece lens exhibiting an apparent field of view of at least 40°.

2. The eyepiece lens of claim 1, wherein:

(a) the aspherical surface is either a most eyewise, facing toward the eye side, lens surface or a most objectivewise, facing toward the objective side, lens surface in any of the first, second, or third lens groups; and (b) the eyepiece lens satisfying the Conditional Expression:

$$0.001 < |d_x/h| < 2.0$$

wherein h is the distance perpendicularly from the optical axis to a point of incidence of a most off-axis ray on the aspherical surface; and $d_x$ is the distance, at h parallel to the optical axis, from the aspherical surface to a spherical surface corresponding to the apical curvature radius of the aspherical surface.

3. The eyepiece lens of claim 1, wherein:

(a) the aspherical surface is either concave or convex and is either a most eyewise, facing toward the eye side, lens surface or a most objectivewise, facing toward the objective side, lens surface in the first lens group; and (b) the aspherical surface has a peripheral curvature radius and an apical curvature radius, wherein the peripheral curvature radius is less than the apical curvature radius if the aspherical surface is concave, and the peripheral curvature radius is greater than the apical curvature radius if the aspherical surface is convex.

4. The eyepiece lens of claim 3, satisfying the Conditional Expression:

$$0.001 < |d_x/h| < 2.0$$

wherein h is the distance perpendicularly from the optical axis to a point of incidence of a most off-axis ray on the aspherical surface; and $d_x$ is the distance, at h parallel to the optical axis, from the aspherical surface to a spherical surface corresponding to the apical curvature radius of the aspherical surface.

5. The eyepiece lens of claim 4, further satisfying the Conditional Expression:

$$0.001 < |d_x/h| < 0.84.$$

6. The eyepiece lens of claim 4, further satisfying the Conditional Expression:

$$(r_b + r_a)/(r_b - r_a) < 0$$

wherein $r_a$ and $r_b$ are apical curvature radii of the eye-side lens surface and the objective-side lens surface, respectively, of the first lens group $G_1$.

7. The eyepiece lens of claim 3, satisfying the Conditional Expression:

$$(r_b + r_a)/(r_b - r_a) < 0$$

wherein $r_a$ and $r_b$ are apical curvature radii of the eye-side lens surface and the objective-side lens surface, respectively, of the first lens group $G_1$.

8. The eyepiece lens of claim 1, wherein:

(a) the aspherical surface is at least one of a most eyewise, facing toward the eye side, lens surface of the second lens group, a most objectivewise, facing toward the objective side, lens surface of the second lens group, a most eyewise, facing toward the eye side, lens surface of the third lens group, and a most objectivewise, facing toward the objective side, lens surface of the third lens group; and (b) the aspherical surface having a peripheral curvature radius and an apical curvature radius, wherein the peripheral curvature radius is less than the apical curvature radius if the aspherical surface is concave, and the peripheral curvature radius is greater than the apical curvature radius if the aspherical surface is convex.

9. The eyepiece lens of claim 8, satisfying the Conditional Expression:

$$0.001 < |d_x/h| < 2.0$$

wherein h is the distance perpendicularly from the optical axis to a point of incidence of a most off-axis ray on the aspherical surface; and $d_x$ is the distance, at h parallel to the optical axis, from the aspherical surface to a spherical surface corresponding to the apical curvature radius of the aspherical surface.

10. The eyepiece lens of claim 9, further satisfying the Conditional Expression:

$0.001 < |d_a/h| < 0.45$.

11. The eyepiece lens of any one of claims 1–10, wherein:
(a) the aspherical surface has a profile defined by the equation:

$$x = \frac{C_0 y^2}{1 + \sqrt{1 - KC_0^2 y^2}} + \sum_{i=2}^{N} C_{2i} y^{2i} \ (N \geq 2)$$

wherein, for each point on the profile, x is an axial distance from the apex of the aspherical surface to the point and y is a distance perpendicular to the optical axis from the apex of the aspherical surface to the point, and wherein $C_0$ is the apical curvature of the aspherical surface, $\kappa$ is a conical constant, and $C_{2i}$ is the $2i^{th}$-order ($i \geq 2$) aspherical surface coefficient; and (b) the fourth-order aspherical surface coefficient $C_4$ satisfies the Conditional Expression:

$|C_4| < 1 \times 10^{-3}$.

12. The eyepiece lens of claim 11, wherein the fourth-order aspherical surface coefficient $C_4$ further satisfies the Conditional Expression:

$|C_4| > 1 \times 10^{-8}$.

13. The eyepiece lens of claim 1, wherein any 6-aspherical lens element in the first lens group $G_1$, the second lens group $G_2$, or the third lens group $G_3$ is made of a material selected from a group consisting of optical glass and optical polymeric materials.

* * * * *

UNITED STATES PATENT AND TRADEMARK OFFICE
CERTIFICATE OF CORRECTION

PATENT NO. : 5,726,808

DATED : March 10, 1998

INVENTOR(S) : Masami Suzuki

It is certified that error appears in the above-identified patent and that said Letters Patent is hereby corrected as shown below:

Column 1, line 32, "a lens" should be --a positive lens--.

Column 9, line 19, in Table 3, in the third column of the fourth row under the heading "Lens Specifications", "6.0" should be --5.5--.

Column 9, line 30, in Table 3, the second-listed Coefficient under the heading "Aspherical Surface Data" should be --$C_6 = -0.51 \times 10^{-8}$--.

Column 9, line 32, in Table 3, the fourth-listed Coefficient under the heading "Aspherical Surface Data" should be --$C_{10} = -0.42 \times 10^{-12}$--.

Column 9, line 51, in Table 4, in the second column of the second row under the heading "Lens Specifications", "-23.0" should be -- -27.0 --.

Column 10, line 17, in Table 5, in the second column of the fourth row under the heading "Lens Specifications", "40.2" should be -- -40.2 --.

Column 10, line 63, after "greatly" insert --improved--.

Signed and Sealed this

Twelfth Day of January, 1999

Attest:

*Attesting Officer*     *Acting Commissioner of Patents and Trademarks*